(12) United States Patent
Tanioka et al.

(10) Patent No.: US 7,870,768 B2
(45) Date of Patent: Jan. 18, 2011

(54) POWER STEERING LOCK UNIT

(75) Inventors: Daisuke Tanioka, Hiroshima (JP);
Hideki Noma, Hiroshima (JP)

(73) Assignee: U-Shin Ltd., Tokyo (JP)

( * ) Notice: Subject to any disclaimer, the term of this patent is extended or adjusted under 35 U.S.C. 154(b) by 465 days.

(21) Appl. No.: 11/976,275

(22) Filed: Oct. 23, 2007

(65) Prior Publication Data

US 2008/0098777 A1 May 1, 2008

(30) Foreign Application Priority Data

Oct. 27, 2006 (JP) ............................. 2006-292819
Oct. 27, 2006 (JP) ............................. 2006-292823

(51) Int. Cl.
*B60R 25/02* (2006.01)
(52) U.S. Cl. .............................. 70/186; 70/252; 70/276
(58) Field of Classification Search ........... 70/182–186, 70/252, 276
See application file for complete search history.

(56) References Cited

U.S. PATENT DOCUMENTS

| | | | |
|---|---|---|---|
| 6,218,742 B1* | 4/2001 | Lafontaine et al. ......... 307/10.6 |
| 6,543,262 B2* | 4/2003 | Limburg et al. ............... 70/186 |
| 6,915,671 B2* | 7/2005 | Zillmann ..................... 70/186 |
| 7,065,993 B2* | 6/2006 | Fukushima ................... 70/252 |
| 7,140,213 B2* | 11/2006 | Feucht et al. ................. 70/186 |
| 7,151,324 B2* | 12/2006 | Neuhoff et al. ............ 307/10.2 |
| 7,328,596 B2* | 2/2008 | Hasegawa et al. ............. 70/186 |
| 7,412,858 B2* | 8/2008 | Tsukano et al. ............... 70/186 |
| 2001/0025516 A1* | 10/2001 | Starken ........................ 70/186 |
| 2005/0183476 A1 | 8/2005 | Feucht et al. |
| 2006/0021397 A1* | 2/2006 | Hasegawa ..................... 70/186 |
| 2006/0021399 A1* | 2/2006 | Hasegawa ..................... 70/186 |
| 2007/0006620 A1* | 1/2007 | Fukushima ................... 70/186 |
| 2007/0113604 A1* | 5/2007 | Khoury et al. ................ 70/186 |
| 2008/0047309 A1* | 2/2008 | Okuno et al. ................. 70/252 |
| 2008/0087056 A1* | 4/2008 | Tsukazaki .................... 70/182 |
| 2009/0133452 A1* | 5/2009 | Hirche et al. ................. 70/183 |

FOREIGN PATENT DOCUMENTS

JP 2006-36110 2/2006

OTHER PUBLICATIONS

Chinese Office Action (and English translation thereof) issued Apr. 13, 2010 in Chinese Application No. 200710184814.5, which is a foreign counterpart of the present application.

* cited by examiner

*Primary Examiner*—Lloyd A Gall
(74) *Attorney, Agent, or Firm*—Wenderoth, Lind & Ponack, L.L.P.

(57) ABSTRACT

The present invention suppresses rattle and assembly inaccuracies of a magnet and magnet detection sensor, and detects with certainty the position of a lock bolt. The power steering lock unit includes a lock bolt, which is movable between lock and unlock positions, an actuator for causing the lock bolt to move; a transmission mechanism for transmitting the drive force of the actuator to the lock bolt; and position detection sensor for detecting the movement position of the lock bolt. The position detection sensor includes a movable member to which a magnet is fixed, a base plate on which a magnetic detection sensor for detecting the magnetic force of the magnet is disposed, and a holder for movably holding the movable member at a prescribed spacing from the base plate. A linking mechanism is provided for operating the movable member in response to operation of the lock bolt or the transmission mechanism.

8 Claims, 9 Drawing Sheets

Fig.12

POWER STEERING LOCK UNIT

BACKGROUND OF THE INVENTION

1. Field of the Invention

The present invention relates to a power steering lock unit for locking the steering in an automobile or the like.

2. Description of the Related Art

Conventionally, with the object of preventing theft, power steering lock units used for locking the steering in an automobile or the like have an engaging concave portion provided on the outer periphery of a steering shaft which rotates in accordance with a steering operation. When a driver performs an engine stopping operation using a key or the like, a retractable lock bolt advances and engages the engaging concave portion due to the action of an actuator, and thus the rotation of the steering shaft is restricted and the steering is locked. On the other hand, when the driver performs an engine starting operation using a key, the lock bolt retracts from the engaging concave portion and the engagement is released, thus the restriction of the rotation of the steering shaft is released and the steering is unlocked. After the steering is unlocked the engine can be started.

With this type of power steering lock unit, it is necessary to prevent with certainty the lock operation from being performed while the automobile is running, even if a microcomputer serving as control means malfunctions due to abnormal rises in temperature. Moreover, even in the case that the steering does become locked, it is necessary that the steering can be quickly unlocked. Thus it is necessary to detect (obtain) with certainty the position of the lock bolt using a sensor. The sensor also plays a role on detecting the stop timing of the actuator and preventing excessive operation of the actuator.

The following is information from a prior art document that is related to such a power steering lock unit.

[Patent Document 1] Japanese Unexamined Patent Application Publication No. 2006-36110.

Japanese Unexamined Patent Application Publication No. 2006-36110 discloses a structure for detecting the position of a lock bolt, in which a magnet is disposed on the lock bolt or a lock stopper which is interlocked with the lock bolt, and in which the position of the lock bolt is detected by detecting the magnetism of the magnet with a Hall IC.

However, with the power steering lock unit in Japanese Unexamined Patent Application Publication No. 2006-36110, there are cases in which rattling movements from vibrations during running of the automobile, inaccuracies in assembling each part, or the like can cause the magnet and the Hall IC to separate from a detection range so that the detection state of the Hall IC is unintentionally switched, and thus the position of the lock bolt cannot be detected with certainty. In this case, even if for example the steering is unlocked during running of the automobile, an incorrect operation occurs, such as the operation of a failure determination function of the power steering lock unit, or the operation of an alarm function, when the unlocked state cannot be detected.

SUMMARY OF THE INVENTION

The present invention, in light of the problem in the prior art, has an object of providing a power steering lock unit which can suppress rattling movements or inaccuracies in assembly of the magnet and the magnetic detection means, and which can detect with certainty the position of the lock bolt.

In order to solve the above problem, a power steering lock unit which is the first aspect of the present invention is structured comprising: a lock bolt which is movable between a lock position, at which the lock bolt engages a steering shaft, and an unlock position, at which the engagement is released; an actuator for moving the lock bolt; a transmission mechanism for transmitting the drive force of the actuator to the lock bolt and thus moving the lock bolt between the lock position and the unlock position; and position detection means for detecting the movement position of the lock bolt, wherein the position detection means comprises: a movable member to which a magnet is fixed; a base plate on which magnetic detection means, for detecting the magnetic force of the magnet, is disposed; and a holder for holding, in an operable manner, the movable member at a prescribed spacing from the base plate, a linking mechanism is provided in interlocked operation with operation of the movable member linked to the operation of the lock bolt or the transmission mechanism, and the movement position of the lock bolt via the movable member and the transmission mechanism is detected through detecting the magnetism of the magnet of the movable member with the magnetic detection means.

In the power steering lock unit, preferably, the movable member is ring-shaped, in which the center of rotation thereof is set perpendicular to the base plate, and the linking mechanism comprises: an operating portion provided in a rotation gear, which rotates on the same axis as the movable member and which constitutes the transmission mechanism; and a receiving portion, which is provided on the movable member and on which the operating portion abuts.

A power steering lock unit which is the second aspect of the present invention is structured comprising: a lock bolt which is movable between a lock position, at which the lock bolt engages a steering shaft, and an unlock position, at which the engagement is released; an actuator for moving the lock bolt; a transmission mechanism for transmitting the drive force of the actuator to the lock bolt and thus moving the lock bolt between the lock position and the unlock position; and position detection means for detecting the movement position of the lock bolt, wherein the transmission mechanism has a rotation gear that moves in response to the lock bolt, the position detection means has: a movable member provided with a receiving portion that abuts on an operating portion provided in the rotation gear; and a sensor for detecting the movement position of the movable member, a play is provided between the operating portion and the receiving portion so that the movable member moves, after a prescribed delay time, in response to the movement of the rotation gear, and with respect to a first detection position for detecting, with the sensor, movement of the rotation gear to the unlock position when the rotation gear rotates from a lock side to an unlock side, a second detection position for detecting, with the sensor, retraction of the rotation gear from the unlock position when the rotation gear rotates from the unlock side to the lock side, is positioned to the lock side.

In this power steering lock unit the second detection position, which detects the unlock state, is positioned on the lock side of the first detection position, thus the detection region, when the movement is from the unlock position to the lock position, is wide. As a result, even if vibrations due to the running of the automobile cause the rotation gear or the movable member to move slightly, the position detection means will not mistakenly determine that there has been a suspension of the unlock state. As a result, the operation of failure determination or alarm functions due to errors in operation is prevented with certainty.

In this power steering lock unit, preferably, movement prevention means is provided, so as to be positioned between the first and second detection positions, for preventing the rotation gear from moving from the unlock side to the lock side, and for releasing this prevention by the drive force of the actuator. Thus, the rotation gear is held in the unlock position even if there are vibrations during the running of the automobile, thus once the position sensor switches to the unlock state (first detection position), the position sensor will not switch back from the unlock region when the rotation gear is in the unlock region. Thus the reliability of the sensor output is improved.

In this case, preferably, the transmission mechanism comprises: a cam groove, which is provided in one of the rotation gear and the lock bolt, revolves forming a substantially spiral state with the center thereof being the center of rotation of the rotation gear, and which converts the rotational movement of the rotation gear to the linear movement of the lock bolt; and a cam follower, which is provided on the other of the rotation gear and the lock bolt, and which slidingly moves in the cam groove, wherein the movement prevention means comprises a protrusion portion which protrudes into the cam groove, so that the sliding movement of the cam follower is prevented. Thus, the movement prevention means is provided with a simple structure.

Moreover, preferably, a second sensor is further comprised for detecting a third detection position for determining whether a tip end of the lock bolt retracts, via the rotation gear, from an opening end of an engaging concave portion of the steering shaft, when the lock bolt rotates from the unlock side to the lock side. Thus, a determination can be made as to whether the lock bolt operated to a position that can be considered substantially safe.

Furthermore, a power steering lock unit which is the third aspect of the present invention is structured comprising: a lock bolt which is movable between a lock position, at which the lock bolt engages a steering shaft, and an unlock position, at which the engagement is released; an actuator for moving the lock bolt; a transmission mechanism for transmitting the drive force of the actuator to the lock bolt and thus moving the lock bolt between the lock position and the unlock position; and position detection means for detecting the movement position of the lock bolt, wherein the position detection means has: a movable member provided with a receiving portion that abuts on an operating portion provided on the lock bolt or provided on a member of the transmission mechanism, the member being moved in response to the lock bolt; and a sensor for detecting the movement position of the movable member, a play is provided between the operating portion and the receiving portion so that the movable member moves, after a prescribed delay time, in response to the movement of the lock bolt, and with respect to a first detection position for detecting, with the sensor, movement of the lock bolt to the unlock position when the lock bolt moves from a lock side to an unlock side, a second detection position, for detecting, with the sensor, retraction of the lock bolt from the unlock position when the lock bolt rotates from the unlock side to the lock side, is positioned to the lock side.

In the first aspect of the power steering lock unit of the present invention, the movable member, to which the magnet is fastened, is held, in an operable manner, by the holder at a prescribed spacing to the base plate on which the magnetic detection means is disposed, thus the lock bolt and the transmission mechanism are not influenced by rattling movements, and the magnetic detection means and the magnet can be maintained at a prescribed spacing from each other. As a result, the accuracy of detecting the position of the lock bolt, via the movable member and the transmission mechanism, improves.

Moreover, the movable portion is structured with a ring shape and structured to rotate, thus the movement space of the movable member is made smaller. As a result, the actual power steering lock unit is made smaller.

In the second and third aspects of the power steering lock unit of the present invention, the second detection position, which detects the unlock state, is positioned on the lock side of the first detection position, thus the detection region is wide. As a result, the position detection means will not mistakenly determine that there has been a suspension of the unlock state due to vibrations during the running of the automobile or the like, thus the operation of failure determination or alarm functions due to errors in operation is prevented with certainty.

EXPLANATION OF NUMERALS

1 . . . steering shaft
2 . . . engaging concave portion
10 . . . case
23 . . . cover
32 . . . lock bolt
33 . . . engaging convex portion
37 . . . cam member
42 . . . cam grooves (transmission mechanism)
43 . . . protrusion portion
44 . . . actuator
45 . . . electric motor
46 . . . worm
47 . . . rotation gear (transmission mechanism)
48 . . . worm wheel portion
51 . . . vertical grooves
53 . . . operating portion
54 . . . cam follower (transmission mechanism)
61 . . . movable member
62 . . . magnet
64 . . . receiving portion
65 . . . base plate 68A-68C ... magnetic sensors (magnetic detection means)
69 ... microcomputer (control means)
70 ... holder

DESCRIPTION OF THE PREFERRED EMBODIMENTS

An explanation of an embodiment of the present invention will be given below with reference to the drawings.

Figure 1:
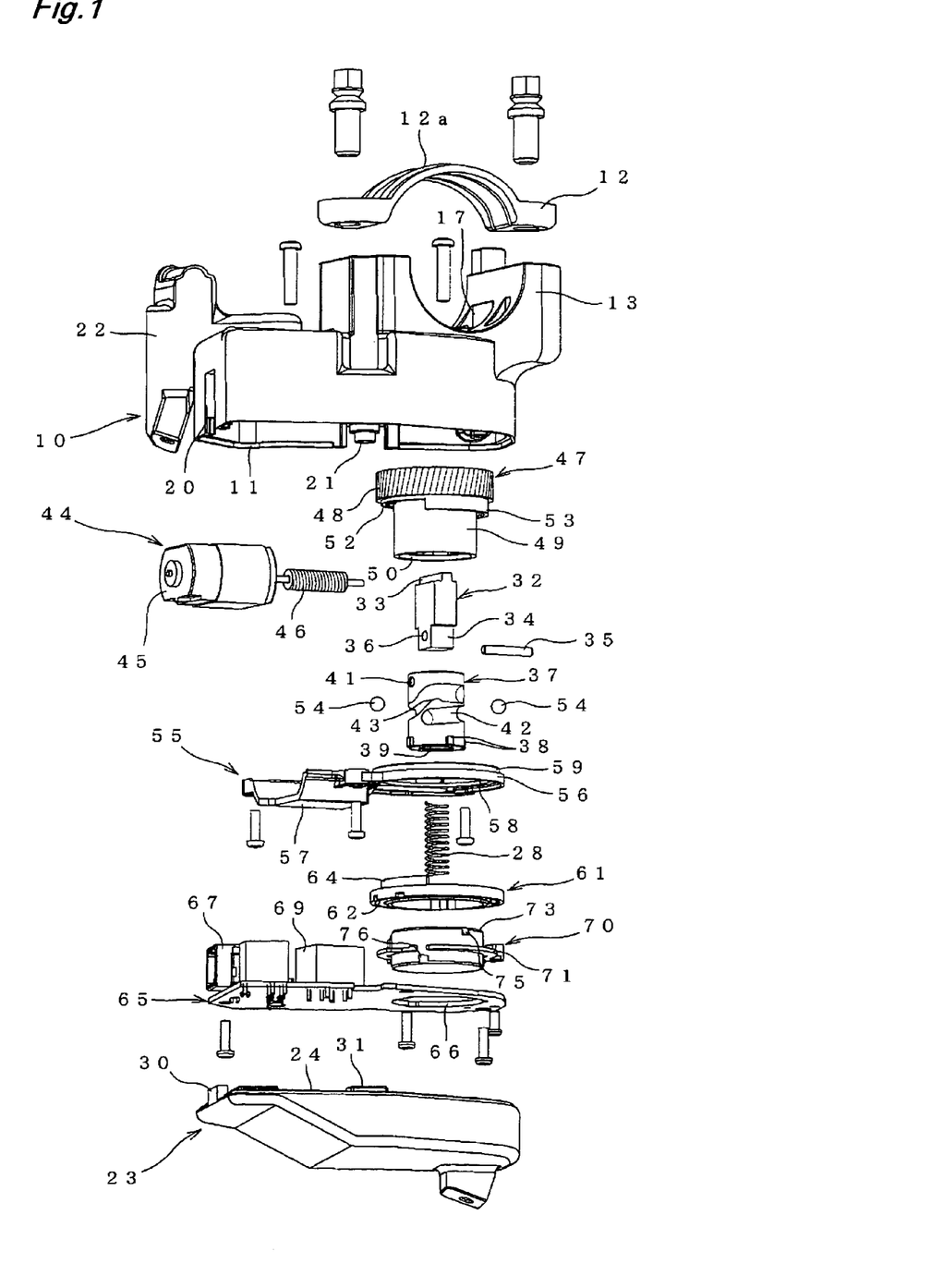
FIG. 1 is an exploded perspective view showing a power steering lock unit according to an embodiment of the present invention.
Figure 2:
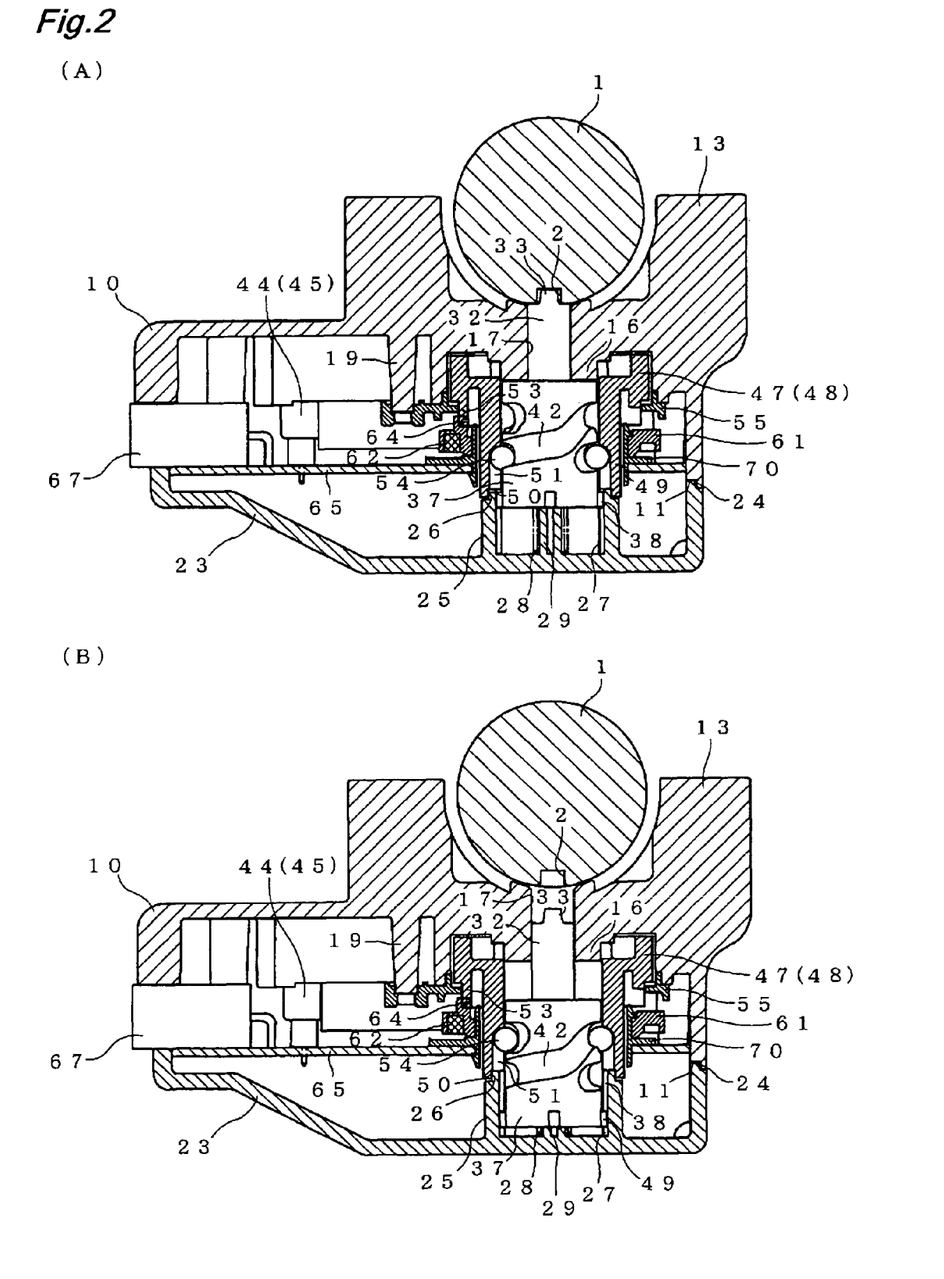
FIG. 2A is a cross section view, of essential elements, showing a locked state.
FIG. 2B is a cross section view, of essential elements, showing an unlocked state.
Figure 3:
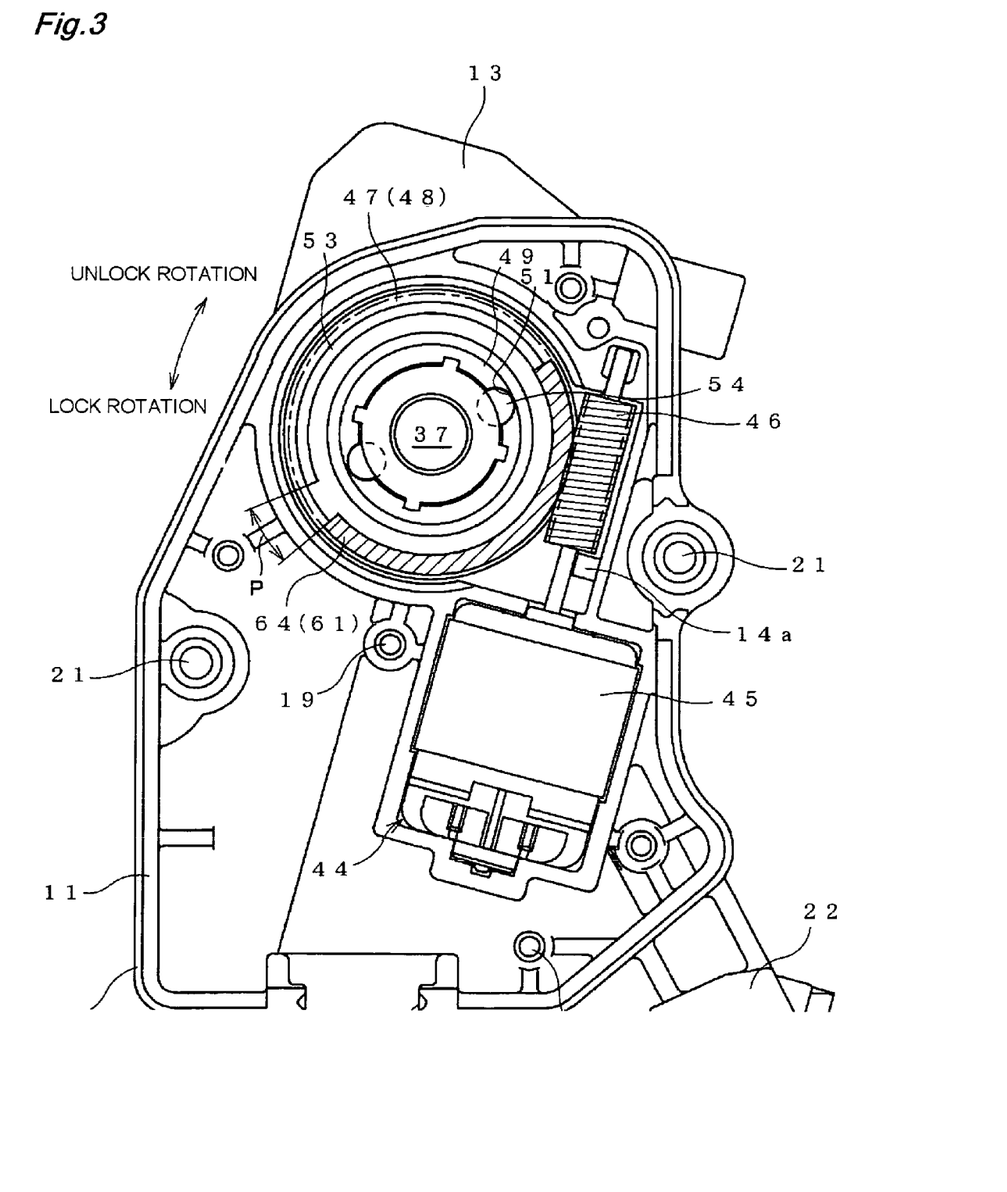
FIG. 3 is bottom view, of essential elements, showing a state with a cover removed.

FIGS. 1 to 3 show a power steering lock unit (referred to as a "lock unit" below) for an embodiment according to the present invention. The lock unit is provided on the outer periphery of a steering shaft 1 which rotates in accordance with a steering operation. The lock unit moves linked to the operation of a key or a start knob for starting or stopping an engine or the like. An engaging concave portion 2 is formed in the steering shaft 1 at a prescribed position in the peripheral direction thereof, in the same manner as in the prior art.

The lock unit of the present embodiment has a casing which comprises a case 10 having an opening on one end and a cover 23 for closing the opening of the case 10, and which is fastened so that the lock unit is positioned at the engaging concave portion 2 of the steering shaft 1. Housed in the inner portion of the casing is a lock bolt 32 for engaging the engaging concave portion 2, an actuator 44 which is drive means for the lock bolt 32, a transmission mechanism for transmitting a drive force from the actuator 44 to the lock bolt 32, and a position detection mechanism for detecting the movement position of the lock bolt 32.

Figure 4:
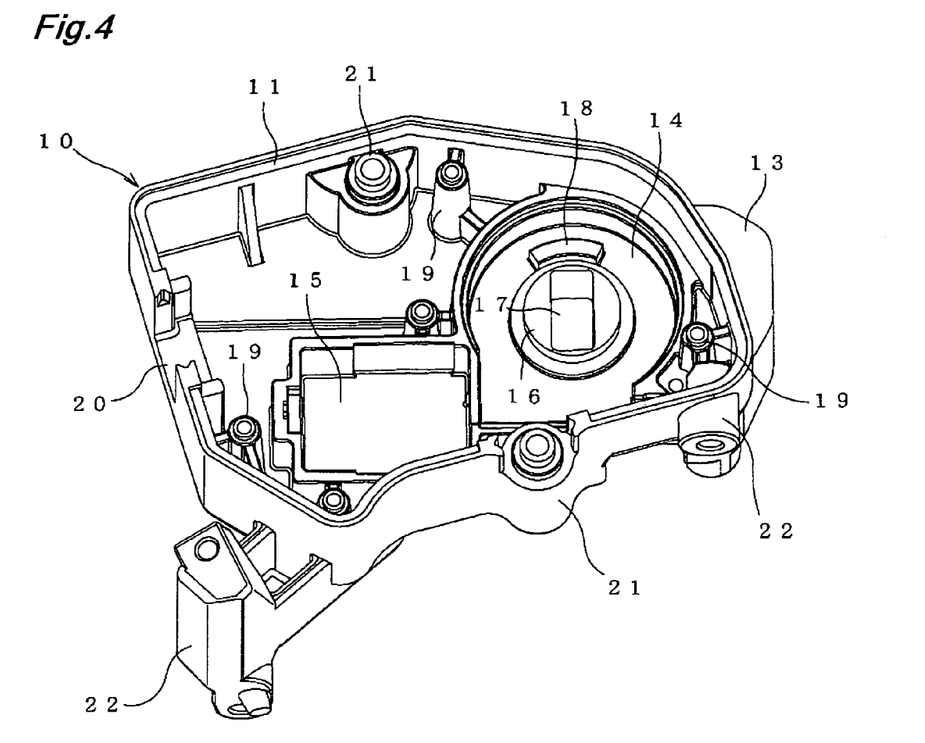
FIG. 4 is a perspective view of the case.

The case 10 has a tray-like shape with an opening on one end thereof, and is formed with an engaging step portion 11 on the opening edge for determining the position of a cover 23 to be described below. A holding portion 13 is provided on one side of the case 10 so that the holding portion 13 is fitted around the steering shaft 1 in cooperation with a bracket 12 having a holding portion 12a that has a semicircular shape. As shown in FIGS. 2 and 4, a gear installation portion 14 on which a rotation gear 47 and a worm 46 are disposed, which are described below, and a motor installation portion 15 on which an electric motor 45 is disposed, are provided in the case 10, separated by a protruding wall. The gear installation portion 14 is provided so that the center thereof is positioned corresponding to the diameter direction from the center of the holding portion 13. A position determining convex portion 16, which protrudes with a convex shape, is provided in the center of the gear installation portion 14. An insertion hole 17 is provided for allowing the lock bolt 32 to be inserted retractably so that the lock bolt 32 penetrates the position determining convex portion 16. Moreover, a stopper 18 is provided protrudingly on the outer periphery of the position determining convex portion 16 so as to restrict the rotational movement of a rotation gear 47. Additionally, as shown in FIG. 3, a bending prevention portion 14a is provided which abuts the output shaft of the electric motor 45, the output shaft being disposed to penetrate from the motor installation portion 15, and which prevents the output shaft from bending during rotation. Additionally, a plurality of bosses 19 are provided on the closed side of the case 10 that is opposite the end with the opening, in order to screw in place and dispose a base plate 65 and a holding member 55. A notch portion 20 is provided on the side wall positioned opposite the gear installation portion 14 in the case 10 in order to expose a connector 67. Note that, the notation 21 in FIG. 4 denotes a screw clamp portion for screwing down and fastening the cover 23. The notation 22 denotes a bracket portion for disposing the case 10 in a vehicle.

Figure 5:
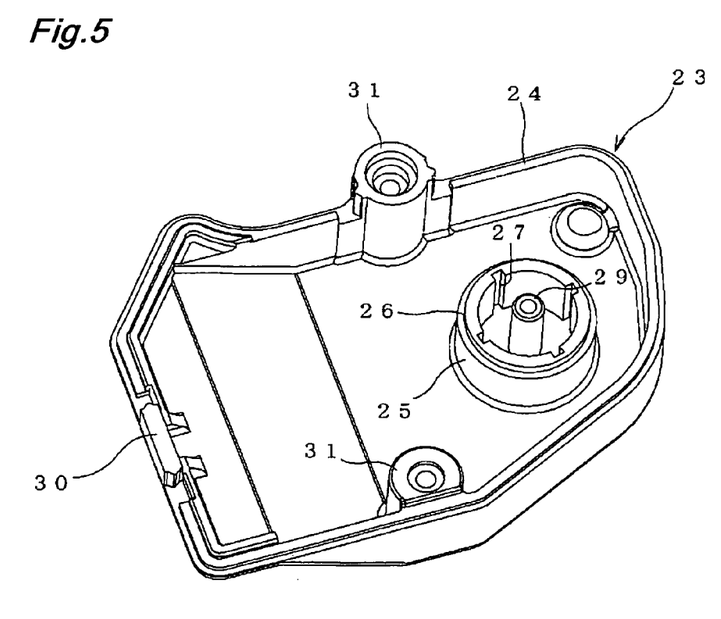
FIG. 5 is a perspective view of a cover.

As shown in FIGS. 2 and 5, the cover 23 has a tray-like shape with an opening on one end for enclosing the opened end of the case 10. An engaging portion 24 is provided, on the opening end of the cover 23, for engaging the engaging step portion 11. A position determining cylinder portion 25 for determining the position of the end portion of the rotation gear 47 is provided on the cover 23 so that the position determining cylinder portion 25 corresponds to the gear installation portion 14. The position determining cylinder portion 25 is provided so that the shaft center thereof is aligned with the center of the gear installation portion 14. A fitting convex portion 26 which engages the tip end inner periphery edge of the rotation gear 47 is provided on the tip end edge of the position determining cylinder portion 25. Guide grooves 27 are provided at a predetermined spacing from each other (90 degrees) on the inner periphery surface of the position determining cylinder portion 25 for preventing a cam member 37 to be described below from rotating but allowing the cam member 37 to advance and retract in the shaft axis direction thereof. Furthermore, a holding cylinder portion 29 is provided in the center of the position determining cylinder portion 25 for holding a spring 28, shown in FIG. 1, in an inserted state. The spring 28 acts as biasing means for biasing the lock bolt 32 via the cam member 37 so that the lock bolt 32 advances from the insertion hole 17. A position determining convex portion 30 is provided at a position opposite the notch portion 20 for determining the position of the connector 67 in an enclosed state. Moreover, in the same manner screw clamp portions 31 are provided at positions opposite the screw clamp portions 21.

Figure 6:
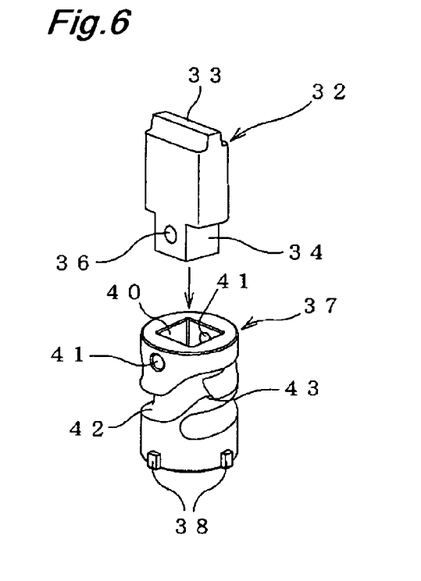
FIG. 6 is an exploded perspective view of a lock bolt and a cam member.

The lock bolt 32, as shown in FIGS. 2 and 6, has a squared column shape so as to be insertable into the insertion hole 17. An engaging convex portion 33 is provided on the upper end of the lock bolt 32 for inserting into and engaging the engaging concave portion 2. The lock bolt 32 moves between a lock position in which it advances and engages the engaging concave portion 2 and an unlock position in which it retracts and disengages the engaging concave portion 2, due to the action of the actuator 44 and the transmission mechanism, which are described below. The lock bolt 32 is biased in the advancement direction thereof by the spring 28 via the cam member 37. A mounting convex portion 34 is provided, on the lower end of the lock bolt 32, and is inserted to and engages with the cam member 37 to be described below. An engaging hole 36 in which an engaging pin 35 shown in FIG. 1 is inserted is provided in the mounting convex portion 34.

The lock bolt 32 in the present embodiment comprises the separate cam member 37 which is linked to the lock bolt 32 by the engaging pin 35. The cam member 37 has a substantial cylinder shape; the lower portion thereof is disposed on the position determining cylinder portion 25 of the cover 23, and the upper portion thereof is disposed on the inner portion of the rotation gear 47, which is described below. Guide convex portions 38 are provided protrudingly at a predetermined spacing in the periphery direction on the lower end outer periphery portion of the cam member 37 so that the guide convex portions 38 are inserted into the guide grooves 27 of the position determining cylinder portion 25. As shown in FIG. 1, on the lower end of the cam member 37, a cylindrically shaped spring housing concave portion 39 for housing the holding cylinder portion 29 and spring 28 is provided with the sunken portion facing upward. As shown in FIG. 6, a rectangular mounting concave portion 40, for mounting the mounting convex portion 34 of the long bolt 32, is provided on the upper end of the cam member 37 with the sunken portion facing downward, and an engaging hole 41, which aligns with the engaging hole 36, is provided penetrating the cam member 37. A pair of cam grooves 42, which are sunken with a substantially semicircular shape, and which encircle the cam member 37 to form a spiral shape, are provided opposing each other in the diameter direction on the outer periphery portion of the cam member 37. The axial center of the cam grooves 42 is centered on the axial center of the rotation of the rotation gear 47. The cam grooves 42 convert the rotational movement of the rotation gear 47 to the linear movement of the lock bolt 32, via the cam member 37. A prescribed region on one end (lower end) of the cam grooves 42 is preset as the lock region of the steering shaft 1 by the lock bolt 32, and a prescribed region on the other end (upper end) thereof is preset as the unlock region of the steering shaft 1 by the lock bolt 32. A protrusion portion 43 is provided positioned between the cam grooves 42 and protruding upwardly, at the border portion of the unlock region. Note that a detailed explanation of the cam grooves 42 and the protrusion portion 43 will be given below.

The actuator 44 is the power source which causes the lock bolt 32 to move and is formed from the electric motor 45 disposed on the motor installation portion 15 and a worm 46, which is a screw gear disposed on the output shaft of the electric motor 45. The electric motor 45 is one in which both forward operation, for advancing the cam member 37, and reverse operation, for retracting the cam member 37, are possible.

As shown in FIGS. 1 and 2, the transmission mechanism comprises the cam grooves 42 provided on the cam member 37; the rotation gear 47, which is disposed in a retractable state in the inner portion of the cam member 37, and which rotates due to the action of the actuator 44; and a cam follower 54, which is disposed on the rotation gear 47, and which causes the cam member 37 to move.

Figure 7:
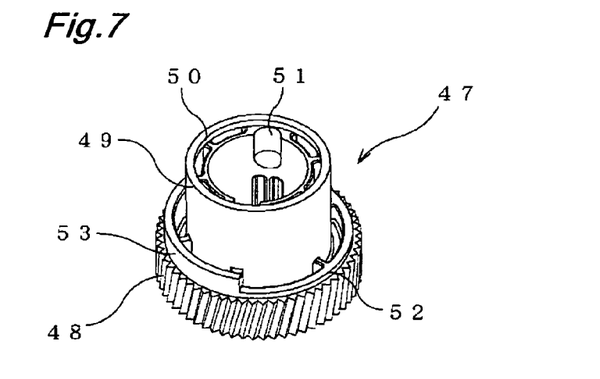
FIG. 7 is a perspective view of a rotation gear.

The rotation gear 47, as shown in FIGS. 2 and 7, comprises a worm wheel portion 48, on the outer periphery portion of the rotation gear 47, in which the worm wheel portion 48 has a plurality of beveled teeth which mesh with the teeth of the worm 46. The worm wheel portion 48 has an outer diameter that is slightly smaller than that of the gear installation portion 14 in the case 10. An inner cylinder 49 which is coaxial with the rotation axis of the worm wheel portion 48 and which has a slightly larger diameter than a cam member 37 linked to the lock bolt 32 is formed integrally in the inner portion of the worm wheel portion 48. The dimensions from the end portion of the worm wheel portion 48, which is one end of the rotation gear 47, to the end portion of the inner cylinder 49, which is the other end of the rotation gear 47 (in other words, the entire height of the rotation gear 47), are slightly larger than the dimensions when assembled between the base of the gear installation portion 14 of the case 10 and the tip end of the position determining cylinder portion 25 of the cover 23. The inner cylinder 49 houses the cam member 37 in the inner portion movably along the rotation axis thereof. The inner diameter of the inner cylinder 49 is slightly larger than the outer diameter of the position determining convex portion 16 of the case 10, and the outer diameter of the inner cylinder 49 is substantially identical to the outer diameter of the position determining cylinder portion 25 of the cover 23. A fitting convex portion 50 is provided on the inner peripheral edge of one end (lower end) opening of the inner cylinder 49, and fits over the fitting convex portion 26 of the position determining cylinder portion 25. A pair of vertical grooves 51, which are sunken with a substantially semicircular shape, and which extend along the axial direction of the inner cylinder 49 from the opening edge of the inner cylinder 49, are provided opposing each other in the diameter direction on the inner periphery side on one end of the inner cylinder 49. An abutting portion (not shown in the drawings) is provided protrudingly on the edge on the other end of the inner cylinder 49 so that the rotation of the inner cylinder 49 is restricted when the abutting portion abuts the stopper 18 of the case 10. A holding step portion 52 is provided on the inner periphery of the lower end surface of the worm wheel portion 48 (the upper end in FIG. 7), so as to maintain the rotation gear 47 in an assembled state inside the case 10. An operating portion 53 is further provided on a prescribed region of the holding step portion 52 so as to link with a movable member 61, to be described below, and thus cause the movable member 61 to move. A detailed explanation of the operating portion 53 will be given below.

The cam follower 54 is consist of a spherical steel ball, and, as shown in FIG. 2, is disposed on the vertical grooves 51 on the rotation gear 47. When the rotation gear 47 rotates in a state in which a portion of the cam follower 54 protruding from the vertical grooves 51 is fitted into the cam grooves 42 of the cam member 37, the cam follower 54 moves slidingly along the cam grooves 42 of the cam portion 37, which is restricted as to be unrotatable, due to the vertical grooves 51 rotating in the peripheral direction thereof, thus causing the lock bolt 32 to advance and retract along the center of rotation of the rotation gear 47 via the cam member 37.

Figure 8:
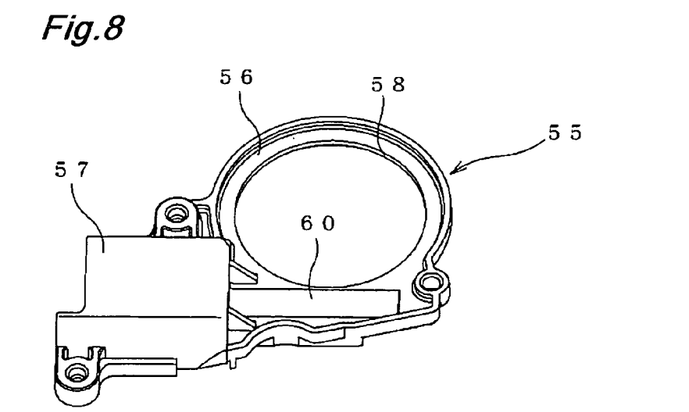
FIG. 8 is a perspective view of a holding member.

The electric motor 45 and the rotation gear 47 are held in assembled to the case 10 by the holding member 55. The holding member 55, as shown in FIGS. 2 and 8, comprises a first enclosing portion 56 for covering the gear installation portion 14 of the case 10, and a second enclosing portion 57 for covering the motor installation portion 15. The first enclosing portion 56 comprises a through hole 58 which has an inner diameter that is slightly larger than that of the holding step portion 52 of the rotation gear 47. A rim portion 59 is provided protrudingly, on one surface (the bottom surface in FIG. 8) of the first enclosing portion 56, so as to fit into the inner surface of the separating wall surrounding the gear installation portion 14 of the case 10. An arc-shaped bulging portion 60 is provided on the first enclosing portion 56 at a position opposite the worm 46 of the actuator 44. The second enclosing portion 57 has a shape that covers the surface, opposite the base of the case 10 in the portion of the electric motor 45. The holding member 55 is fastened to the bosses 19 of the case 10 with screw clamps.

The position detection mechanism, as shown in FIGS. 1 and 2, comprises a movable portion 61 which moves linked to the rotation gear 47, and a base plate 65, which is mounted with magnetic sensors 68A to 68C for detecting the operation position of the movable portion 61. The position detection mechanism detects the rotation position of the movable portion 61 and thus detects the movement position of the lock bolt 32, via the movable member 61, the rotation gear 47 and the cam member 37.

Figure 9:
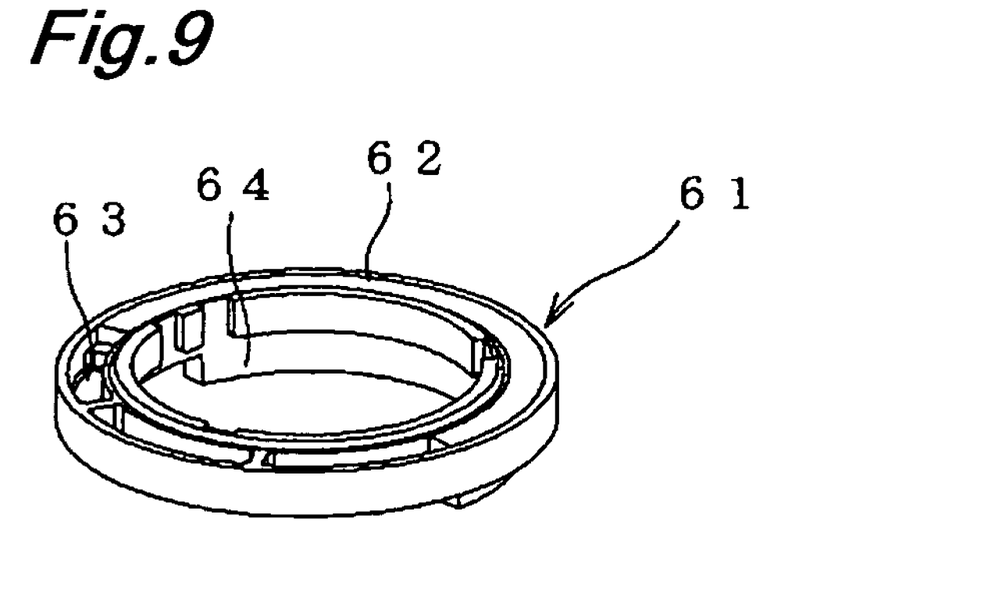
FIG. 9 is a perspective view of a movable member.
Figure 10:
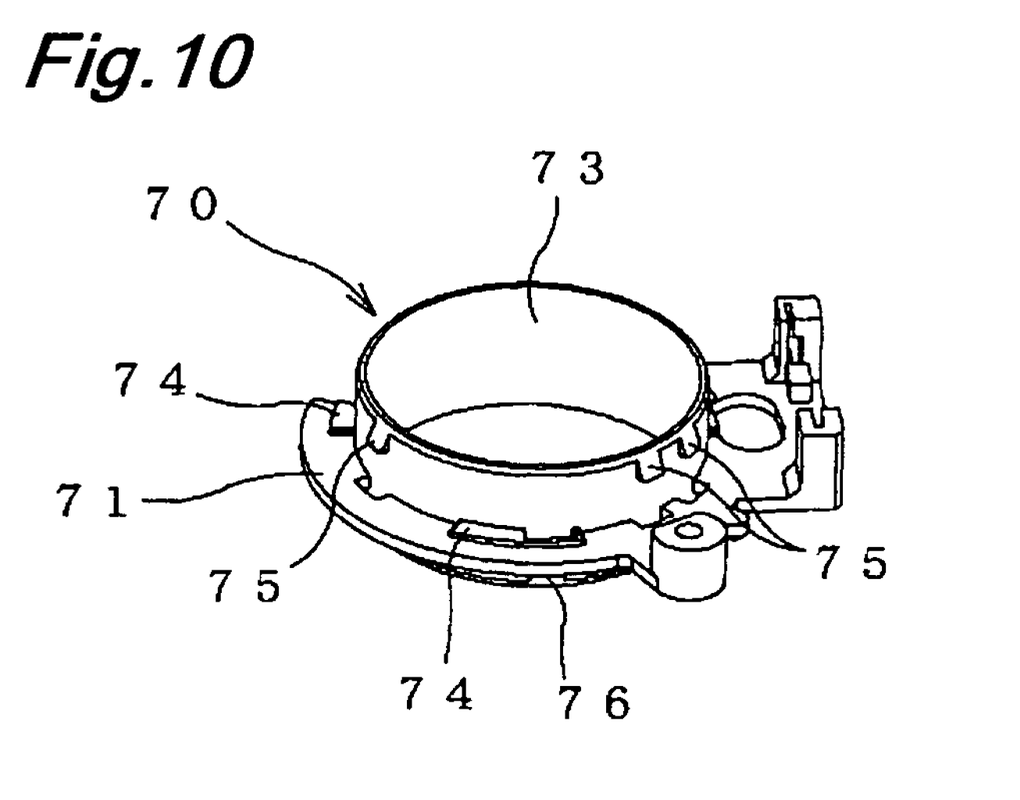
FIG. 10 is a perspective view of a holder.

The movable portion 61, as shown in FIGS. 2 and 9, is fitted over the inner cylinder 49 of the rotation gear 47, and has a ring shape rotatable on the same axis as the center of rotation of the rotation gear 47, which is a direction perpendicular to the base plate 65, which is to be described below. An installation concave portion 63, to which a C-shaped magnet 62 is fixed, is provided on the movable member 61 on one surface thereof (top surface in FIG. 9) which is disposed on the side of the cover 23. A receiving portion 64, which abuts the operating portion 53 of the rotation gear 47, is provided on the surface on the opposite side of the movable member 61. A more detailed explanation of the magnet 62 and the receiving portion 64 will be given below.

The base plate 65, as shown in FIGS. 1 and 2, is mounted with the connector 67, magnetic sensors 68A to 68C and a microcomputer 69 which serves as control means, and each of these components are connected by a well-known circuit pattern. As shown in FIGS. 1 and 2, a through hole 66, having an inner diameter larger than the outer diameter of the inner cylinder 49, is provided in the base plate 65 at a position opposite the inner cylinder 49 of the rotation gear 47. The base plate 65 is electrically connected to the electric motor 45 via wires.

The connector 67, by being connected to a companion connector not shown in the drawings, inputs power from the automobile for operating the electric motor 45 and the like, inputs control signals for the electric motor 45 to perform lock and unlock operations, and outputs detection signals, of the movement position of the lock bolt 32, detected by the position detection mechanism.

The magnetic sensors 68A to 68C are formed from a Hall IC in the same manner as in the prior art, and serve as magnetic detection means, and output a "Low" signal when the magnetic force of the magnet 62 disposed on the movable member is detected, and output a "Hi" signal when the magnetic force of the magnet 62 is not detected. A detailed explanation of the installment position of the magnetic sensors 68A to 68C will be given below. Moreover, the magnetic sensors 68A to 68C are not limited to a Hall IC, but may be implemented with an MR element or the like.

The microcomputer 69 causes the lock bolt 32 to perform lock and unlock operations by controlling the electric motor 45 to drive forward or in reverse, according to a program stored in an internal ROM which acts as memory means. At this time the microcomputer 69 serves as position determination means for detecting the movement position of the movable member 61 on the basis of the detection state of the magnetic sensors 68A to 68C. Moreover, the microcomputer 69 serves as failure determination means for detecting the presence of a failure of any of the magnetic sensors 68A to 68C on the basis of the detection state of the magnetic sensors 68A to 68C.

The movable member 61, as shown in FIGS. 2 and 9, is held movably (rotational movement), at a prescribed spacing from the base plate 65, by a holder 70. The holder 70 comprises a base 71 which is disposed so as to contact the base plate 65. A through hole is provided in the base 71 that is slightly bigger than the inner cylinder 49 of the rotation gear 47, and that is smaller than the through hole 66 of the base plate 65 and smaller than the movable member 61. A cylinder portion 73 is provided on the base 71 that protrudes above and below the inner periphery edge of the through hole. A bulged portion 74 is provided on the border portion of the base 71 and the cylinder portion 73, on the side of a non-contacting surface that is positioned on the opposite side from the base plate 65. The bulged portion 74 serves to reduce the friction resistance that accompanies the rotation of the movable member 61 when the movable member 61 is placed on the base 71, and serves to set the spacing between the movable member 61 and the base plate 65 to a prescribed spacing. Moreover, a holding claw portion 75 is provided on the end portion of the cylinder portion 73 at a position on the non-contacting surface side, so as to penetrate the inner periphery surface of the movable member 61 and latch to the movable member 61 on the case 10 side thereof, and serves to rotatably hold the movable member 61. Furthermore, a latching claw portion 76 is provided on the end portion of the cylinder portion 73 at a position on the contacting surface side, so as to penetrate the through hole 66 of the base plate 65 and latch to the base plate 65 on the cover 23 side thereof.

Next, an explanation will be given of the specific structure of the cam grooves 42 of the cam member 37.

Figure 11:
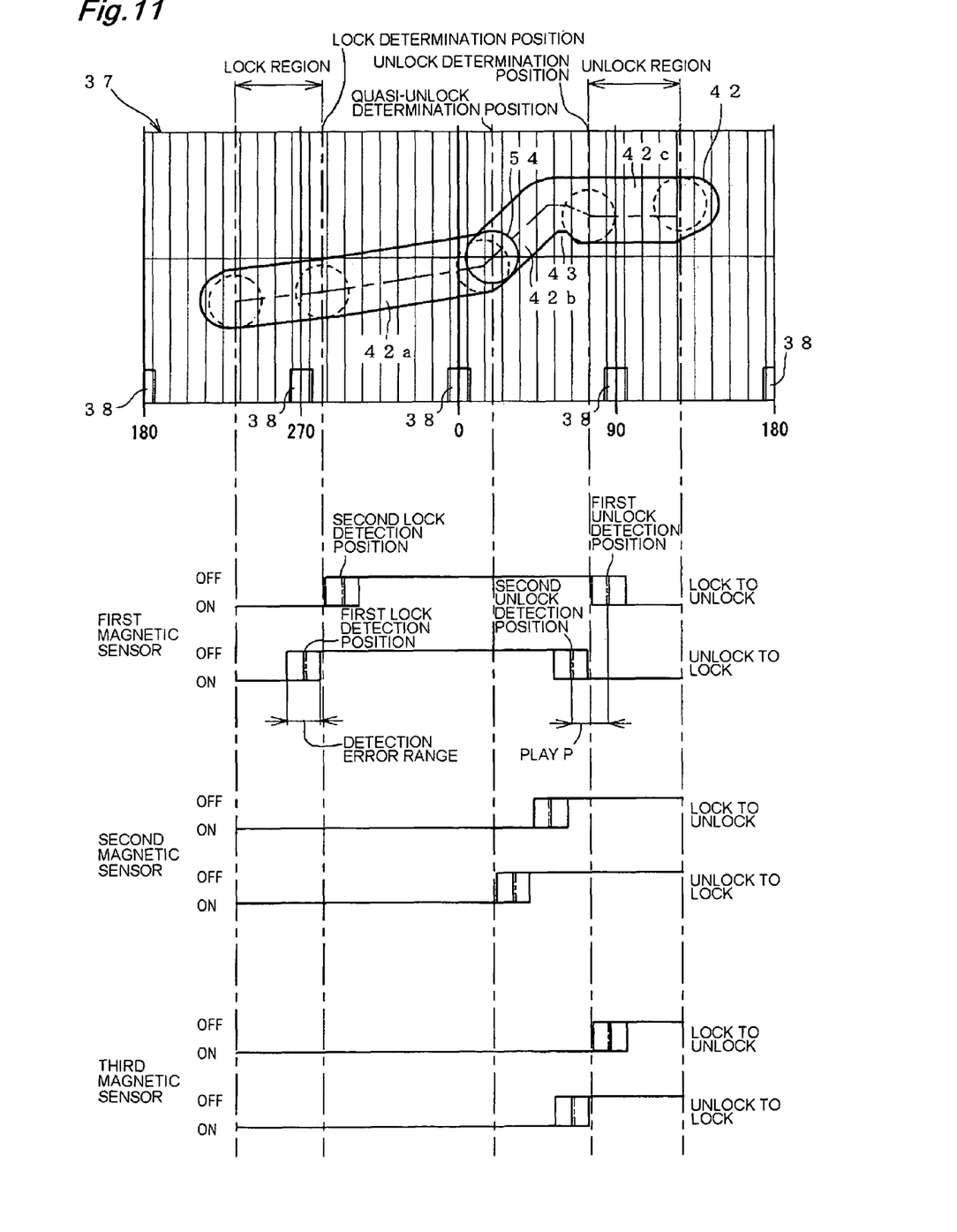
FIG. 11 is a time chart showing the relationship between a cam groove on the cam member and the switching among each magnetic sensor.

The cam grooves 42, as shown in the development view in FIG. 11, comprise: a first extending portion 42a which extends from the lower end thereof upwards at a gentle slope (at about five degrees to a horizontal line); a second extending portion 42b which extends from the end of the first extending portion 42a upwards at a steeper slope (at about 43 degrees to a horizontal line) than that of the first extending portion 42a; and a third extending portion 42c which extends horizontal from the end of the second extending portion 42b. The lower end (left) side of the cam grooves 42 is the position in which the lock bolt 32 is locked, and the upper end (right) side thereof is the position in which the lock bolt 32 is unlocked. Specifically, in a state in which the cam follower 54 does not move vertically along the vertical grooves 51 of the rotation gear 47, when the cam follower 54 is positioned on the lower side of the cam grooves 42, the cam member 37, as shown in FIG. 2A, is in a locked state, having moved upward, and when the cam follower 54 is positioned on the upper side of the cam grooves 42, the cam member 37, as shown in FIG. 2B, is in an unlocked state, having moved downward. In FIG. 11, the sliding movement position (height) of the cam follower 54, shown by dashed lines, relative to the cam grooves 42, is in a state in which the tip end of the engaging convex portion 33 of the lock bolt 32 is positioned on the opening end of the engaging concave portion 2 of the steering shaft 1.

In other words, the present embodiment is structured so that the engaging convex portion 33 of the lock bolt 32 being inserted into the engaging concave portion 2 of the steering shaft 1 causes advancing and retracting in the gently sloped first extending portion 42a, and so that the engaging convex portion 33 being retracted from the engaging concave portion 2 causes advancing and retracting in the sharply sloped second extending portion 42b. Here, when the engaging convex portion 33 is inserted into the engaging concave portion 2 during the advancement and retraction operations of the lock bolt 32, friction resistance arises between the two. Thus when the engaging convex portion 33 is inserted into the engaging concave portion 2, advancing and retraction is performed so the amount of engagement is increased or reduced slowly, and when the engaging convex portion 33 is detached from the engaging concave portion 2, advancing and retraction is performed quickly, and in this manner the sudden load placed on the electric motor 45 is reduced.

On the other hand, in FIG. 11, the position in which the cam follower 54 is positioned on the lower end of the cam grooves 42 is the position in which the abutting portion of the rotation gear 47 abuts one end of the stopper 18 on the case 10, and the position in which the cam follower 54 is positioned on the upper end of the cam grooves 42 is the position in which the abutting portion abuts the other end of the stopper 18. Stated differently, in the present embodiment, the rotation gear 47 is structured to be able to rotate forward or in reverse only in a prescribed range (referred to as the rotation range below) that is less than 360 degrees (about 250 degrees in the present embodiment), by setting the dimensions in the periphery direction of the abutting portion and the stopper 18.

With such cam grooves 42 it is necessary to consider misalignments caused by vibration and the like during running and the rigidity of the lock bolt 32 and the steering shaft 1 and set the region in which the state of the steering shaft 1 being locked by the lock bolt 32 can be recognized, to a height (amount of engagement) of the lock bolt 32 so that the locked state can be maintained with certainty. Moreover, it is necessary to consider misalignments caused by vibration and the like during running, and set the region in which the unlocked state can be recognized to a height (amount of retraction) of the lock bolt 32 so that with certainty the engaging convex portion 33 is not inserted into the engaging concave portion 2.

For this reason in the present embodiment, in addition to the above conditions, the lock region is set to the lowest possible range, including the movement due to inertia after the operation of the electric motor 45 has stopped, so that after the electric motor 45 has stopped the abutting portion of the rotation gear 47 does not abut the stopper 18 of the case 10. Moreover, the second extending portion 42b is extended to a height that meets the above conditions, the third extending portion 42c is provided set to the lowest possible range, including the movement due to inertia after the operation of the electric motor 45 has stopped, so that after the electric motor 45 has stopped the abutting portion of the rotation gear 47 does not abut the stopper 18 of the case 10, and the third extending portion 42c is set as the unlock region. Furthermore, the protrusion portion 43 is formed on the border portion, of the second and third extending portions 42b and 42c, which is the start position of the unlock region, and serves as movement prevention means for preventing the sliding movement of the cam follower 54 within the cam grooves 42. The third extending portion 42c is structured to have a larger width than the other extending portions 42a and 42b due to the structure of providing the protrusion portion 43. Moreover, due to the protrusion portion 43, in the cam member 37 which is biased to advance to the lock side by the spring 28, vibrations during the running of the vehicle cannot cause the cam follower 54 to slide over the protrusion portion 43 which would cause a movement from the unlock position to the lock position, but by applying the drive force of the electric motor 45, the cam follower 54 can slide over the protrusion portion 43 causing a movement from the unlock position to the lock position.

Next a specific explanation of the operating portion 53 of the rotation gear 47 and the receiving portion 64 of the movable member 61 will be given.

The operating portion 53 and the receiving portion 64 constitute a linking mechanism for operating the movable member 61 so that it moves linked to the rotation gear 47. The operating portion 53 and the receiving portion 64, as shown in FIG. 3, together form a substantial C shape when one end of each are abutted against each other, and play P of a prescribed spacing (approximately 18 degrees in the present embodiment) is formed between the two other ends thereof, and the operating portion 53 and the receiving portion 64 respectively form arcs which are portions of circles that have the same center. In this manner, when the electric motor 45 is operated, the rotation gear 47 rotates, and the movable member 61 rotates linked to the rotation gear 47 with a delay that is determined by the time necessary for the rotation to advance the distance of the play P.

Next a specific explanation of the magnet 62 disposed on the movable member 61 and the magnetic sensors 68A to 68C disposed on the base plate 65 will be given.

Firstly, in the present embodiment, as shown in FIG. 11, the movement position of the lock bolt 32 via the movable member 61, the rotation gear 47 and the cam member 37, in other words, whether the lock bolt 32 is within the lock region or within the unlock region, is detected by the main first magnetic sensor 68A. Moreover, whether the engaging convex portion 33 of the lock bolt 32 is completely detached from the opening end of the engaging concave portion 2 of the steering shaft 1 is detected by a sub sensor, the second magnetic sensor 68B. Furthermore, whether the lock bolt 32 is within the unlock region is detected by a second sub sensor, the third magnetic sensor 68C. In this manner even if one of the magnetic sensors 68A to 68C fails, the other two can detect with certainty whether the lock bolt 32 has moved to the unlock region side. Whether the lock bolt 32 has moved to the lock region side may be detected by the magnetic sensors 68A to 68C. However, the present embodiment is structured to detect the unlock side since, if considering the safety of the automobile while running first, the lock bolt 32 being positioned in the unlock region is the safest, and safety cannot be said to be maintainable with certainty in the other regions.

When the play P does not exist between the operating portion 53 and the receiving portion 64, the movable member 61 including the magnet 62 rotates in the same range as the rotation range of the rotation gear 47. With the above condition, in order to detect with the first magnetic sensor 68A whether the lock bolt is within either the lock or the unlock region, firstly, in a state in which the rotation gear 47 is positioned on the end portion on the lock side, the magnet 62 is set so that one end 62a thereof extends from the first magnetic sensor 68A to the lock side beyond the range of the lock region (refer to FIG. 12A). In this manner, the movable member 61 rotates to the unlock side, and a lock determination position is reached which is the border of the lock region at the point in time in which the one end 62a of the magnet 62 passes beyond the first magnetic sensor 68A. In the same manner, in a state in which the rotation gear 47 is positioned on the end portion on the unlock side, the magnet 62 is set so that the other end 62b thereof extends from the first magnetic sensor 68A to the unlock side beyond the range of the unlock region (refer to FIG. 13A). In this manner, a time point when the movable member 61 rotates to the lock side and the other end 62b of the magnet 62 passes beyond the first magnetic sensor 68A is an unlock determination position which is the border of the unlock region. Thus, in order to form such set positions, the C-shaped magnet 62 is disposed extending from one end 62a to the other end 62b in the movable member 61.

Next, a delay time is set so that when the rotation gear 47 moves from the lock side to the unlock side, the detection error range accompanying the magnetic field of the magnet 62 is completely positioned within the unlock region. Then the play P corresponding to this delay time is formed between the operating portion 53 and the receiving portion 64.

As a result, when the rotation gear 47 has performed the unlock rotation (operation), a first unlock detection position is set, by the first magnetic sensor 68A, for detecting that the rotation gear 47 has rotated to the unlock region (position). In the same manner, when the rotation gear 47 has performed the lock rotation, a second unlock detection position is set, by the first magnetic sensor 68A, for detecting that the rotation gear 47 has retracted from the unlock region. The second unlock detection position is set to position further to the lock side than the first unlock detection position. In the present embodiment, with the unlock determination position, which is the border of the unlock region, serving as a reference, the first unlock detection position is positioned on the unlock side and the second unlock detection position is positioned on the lock side. The protrusion portion 43 is positioned between the first and second unlock detection positions.

Moreover, when the rotation gear 47 has performed the unlock rotation, a first lock detection position is set, by the first magnetic sensor 68A, for detecting that the rotation gear 47 has rotated to the lock region. In the same manner, when the rotation gear 47 has performed the unlock rotation, a second lock detection position is set, by the first magnetic sensor 68A, for detecting that the rotation gear 47 has retracted from the lock region. The second lock detection position is set to position further to the unlock side than the first lock detection position. In the present embodiment, with the lock determination position, which is the border of the lock region, serving as a reference, the first lock detection position is positioned on the lock side and the second lock detection position is positioned on the unlock side.

On the other hand, the position at which the cam follower 54 has slid to the border portion of the first and second extending portions 42a and 42b is a quasi-unlock determination position for determining whether the engaging convex portion 33 has advanced into the engaging concave portion 2, and for determining the state in which the engaging convex portion 33 has not completely advanced into the engaging concave portion 2 but has advanced enough to be relatively safe. In the movable member 61 provided with a detection delay time by the play P, the detection position when there is movement from the lock side to the unlock side is positioned more to the unlock side than the detection position when there is movement from the unlock side to the lock side.

Thus the second magnetic sensor 68B is set so that the third detection position, for rotation from the unlock side to the lock side, is positioned on the unlock side with the quasi-unlock determination position serving as a reference and taking into account the detection error range. In this manner, it is so constructed that the second magnetic sensor 68B can determine whether the lock bolt 32 operated to a position that can be considered substantially safe.

Also, it is so constructed that the third magnetic sensor 68C, at a position different from the first magnetic sensor 68A, can detect whether the lock bolt 32 is positioned within the unlock region. The third magnetic sensor 68C is set so that, with reference to the movable member 61 having a detection delay time due to the play P, the detection position, for rotation from the lock side to the unlock side, is positioned on the unlock side with the unlock determination position serving as a reference and taking into account the detection error range. Moreover, the third magnetic sensor 68C is set so that the detection position, for rotation from the unlock side to the lock side, is positioned on the lock side with the unlock determination position serving as a reference and taking into account the detection error range. In this manner, even when the first magnetic sensor 68A fails, the lock bolt 32 being positioned in the unlock region to the degree that can be considered safe with certainty can be detected with certainty.

Next an explanation of the unlock and lock operations of the lock unit will be given.

The electric motor 45 rotates forward in the locked state shown in FIG. 2A in order to move the lock bolt 32 from a locked state to an unlocked state. Thus, as shown in FIG. 3, the rotation gear 47 rotates counterclockwise, via the worm 46, and the cam follower 54, positioned in the vicinity of the lower end of the cam grooves 42, slides through, or moves through while rotating, the cam grooves 42. However, because the cam follower 54 is positioned in the vertical grooves 51 of the rotation gear 47, and thus cannot move in a peripheral direction, the lock bolt 32 begins to move in an advance or retraction direction due to the rotation of the rotation gear 47.

At this time, when the cam follower 54 moves along the first extending portion 42a of the cam grooves 42, the lock bolt 32 retracts from the lock position relatively slowly. In this manner, the pullout load, when the engaging convex portion 33 of the lock bolt 32 is pulled out from the engaging concave portion 2 of the steering shaft 1, can be increased. Thus, even in a state that a setting torque is applied to the steering shaft 1 and the inner surface of the engaging concave portion 2 is in pressure contact with the outer surface of the engaging convex portion 33, the lock bolt 32 can be pulled out with certainty. Moreover, a reduction gear or the like for increasing the pullout load is rendered unnecessary and a smaller electric motor 45 can be achieved. As a result, the overall lock unit can be made smaller.

Subsequently, the lock bolt 32 retracts relatively quickly when the cam follower 54, in accordance with the rotation of the rotation gear 47, moves along the second extending portion 42b of the cam grooves 42. In this manner, the operation time of the electric motor 45 is shortened since the operation of the lock bolt 32 is quicker after the tip end thereof pulls out of the engaging concave portion 2 of the steering shaft 1. Furthermore, the time until the engine can be started after the steering lock is released is shortened and thus the user friendliness is improved.

In this manner, the engagement of the engaging convex portion 33 of the lock bolt 32 to the engaging concave portion 2 of the steering shaft 1 is released, by the lock bolt 32 moving from the lock position to the unlock position. As a result, the restriction of the rotation of the steering shaft 1 is released and the unlock state shown in FIG. 2B is achieved.

Conversely, the electric motor 45 operates in reverse in the unlock state in order to move the lock bolt 32 from an unlock state to a lock state. Thus, as shown in FIG. 3, the rotation gear 47 rotates clockwise via the worm 46, and the cam follower 54 moves within the cam grooves 42. When at this time the cam follower 54 is positioned on the end portion of the third extending portion 42c, the cam follower abuts the protrusion portion 43 and the movement of the cam follower 54 is inhibited. However, the rotation drive force of the rotation gear 47 due to the electric motor 45 causes the cam member 37 to move lower in the axial direction thereof, against the biasing force of the spring 28, and the cam follower 54 moves over the protrusion portion 43 and advances into the second extending portion 42b.

Then the lock bolt 32 advances, in accordance with the biasing force of the spring 28, from the unlock position shown in FIG. 2B to the lock position shown in FIG. 2A. In this manner, the engaging convex portion 33 of the lock bolt 32 advances into and engages the engaging concave portion 2 of the steering shaft 1, the rotation of the steering shaft 1 is restricted, and a lock state is achieved.

At this time there are many cases in which the engaging concave portion 2 of the steering shaft 1 does not align with the engaging convex portion 33 of the lock bolt 32. In this case, the lock bolt 32 cannot advance into the engaging concave portion 2, and the lock state shown in FIG. 2A cannot be achieved. However, the sliding of the cam follower 54 and the cam grooves 42 due to the rotation of the rotation gear 47 is performed identical to that previously described, with the exception that the cam follower 54 moves downward along the vertical grooves 51. When, in this state, the steering shaft 1 rotates and the engaging concave portion 2 aligns with the lock bolt 32, the lock state shown in FIG. 2A is achieved due to the biasing force of the spring 28.

Next, an explanation will be given of the linking of the rotation gear 47 and the movable member 61 that accompanies the lock and unlock operations, and of the on and off operations of the magnetic sensors 68A to 68C caused by the movable member 61.

Figure 12:
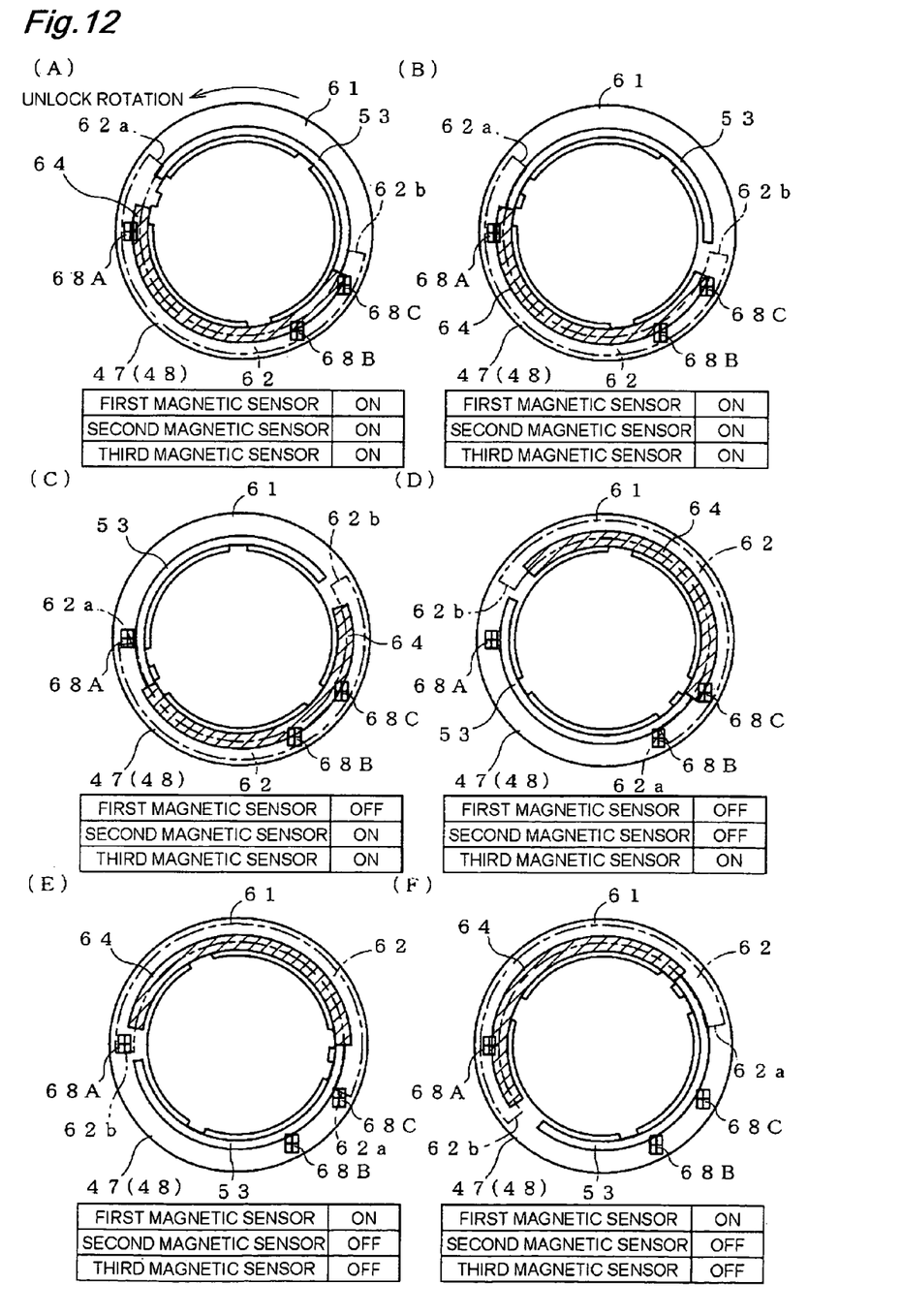
FIGS. 12A to 12F are schematic views showing the transition from a locked state to an unlocked state.

As shown in FIG. 12A, the first to third magnetic sensors 68A to 68C are all ON state in the lock state in which the cam follower 54 is positioned on the lower end of the cam grooves 42. When the microcomputer 69 causes an unlock operation by causing the electric motor 45 to drive forward, and thus causes the rotation gear 47 to rotate counterclockwise, the rotation gear 47, as shown in FIG. 12B, rotates the amount of the play P, and then the operating portion 53 abuts the receiving portion 64 of the movable member 61. In this state the first to third magnetic sensors 68A to 68C all maintain an ON state.

Next, when the rotation gear 47 rotates even further counterclockwise, the movable member 61 rotates counterclockwise linked to the rotation gear 47 due to the operating portion 53 pressing against the receiving portion 64. Then, as shown in FIG. 12C, the first magnetic sensor 68A cannot detect magnetism and thus becomes OFF state when the one end 62a of the magnet 62 disposed on the movable member 61 passes beyond the first magnetic sensor 68A. The second and third magnetic sensors 68B and 68C maintain the ON state.

Next, as shown in FIG. 12D, the second magnetic sensor 68B cannot detect magnetism and thus becomes an OFF state when the one end 62a of the magnet 62 passes, linked to the movable member 61, beyond the second magnetic sensor 68B. The first magnetic sensor 68A maintains the OFF state and the third magnetic sensor 68C maintains the ON state.

Then, as shown in FIG. 12E, linked to the movable member 61, the one end 62a of the magnet 62 passes beyond the third magnetic sensor 68C, and, at approximately the same time, the other end 62b of the magnet 62 passes beyond the first magnetic sensor 68A. In this manner, the third magnetic sensor 68C cannot detect magnetism and thus becomes an OFF state, and the first magnetic sensor 68A can once more detect magnetism and thus becomes an ON state. The second magnetic sensor 68B maintains the OFF state.

Next, the microcomputer 69 detects the state in FIG. 12E via the magnetic sensors 68A to 68C and thus determines that the cam follower 54 has reached the unlock region, and that the lock bolt 32, via the rotation gear 47 and the cam member 37, has reached an unlock state, and then the microcomputer 69 stops the electric motor 45. The rotation gear 47 and the movable member 61 rotate to the state shown in FIG. 12F due to inertia. In this state, the first magnetic sensor 68A maintains the ON state and the second and third magnetic sensors 68B and 68C maintain the OFF state.

Figure 13:
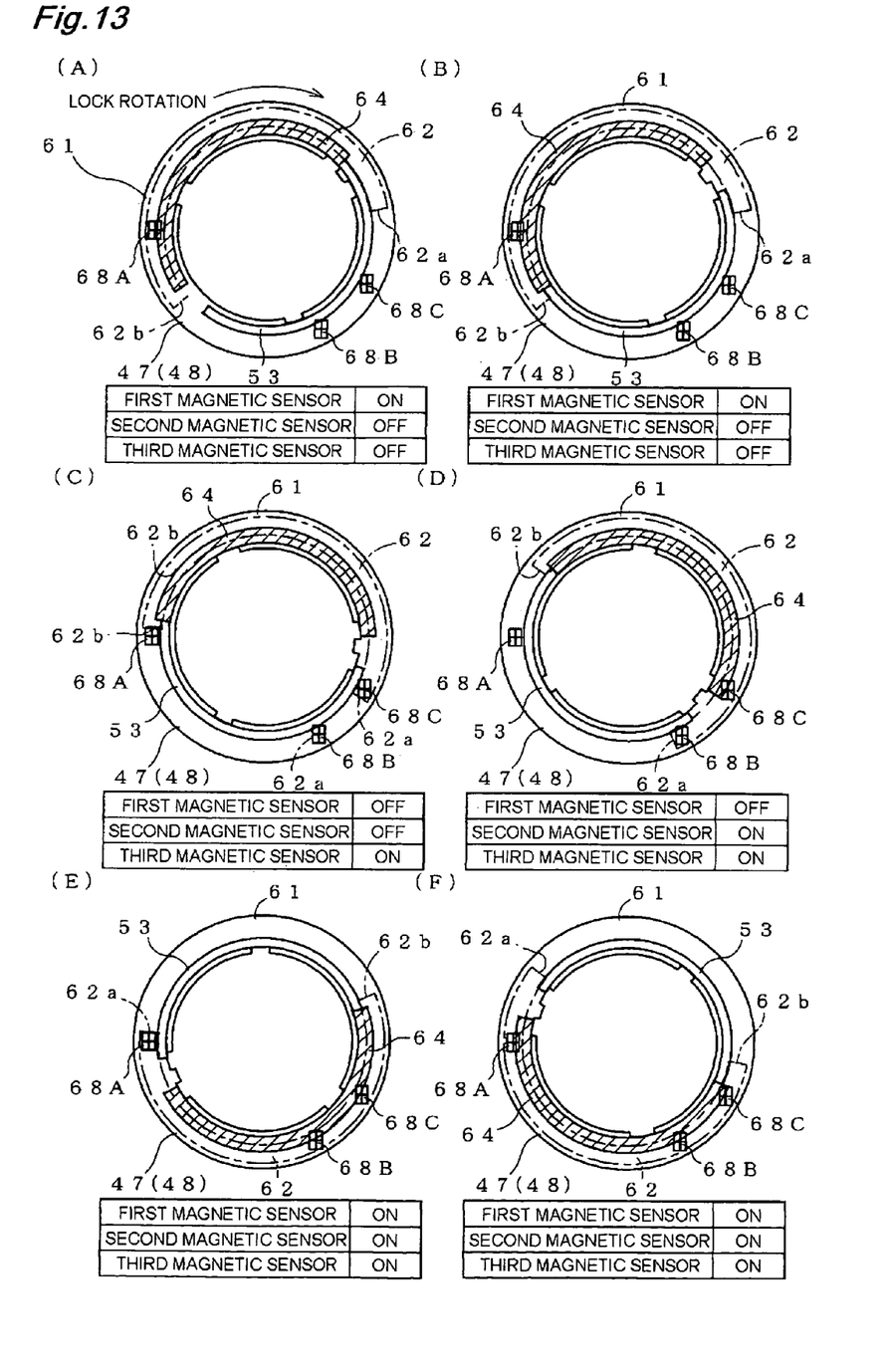
FIGS. 13A to 13F are schematic views showing the transition from an unlocked state to a locked state.

On the other hand, in the unlock state shown in FIG. 13A, which is the same state as in FIG. 12F, when the microcomputer 69 causes the electric motor 45 to drive in reverse and thus causes the rotation gear 47 to rotate clockwise, as shown in FIG. 13B, the rotation gear 47 rotates by the amount of play P, which is formed on the reverse side of the operating portion 53 of the rotation gear 47 and of the receiving portion 64 of the movable member 61, and thus the operating portion 53 abuts the receiving portion 64. In this state, the first magnetic sensor 68A maintains the ON state and the second and third magnetic sensors 68B and 68C maintain the OFF state.

Then, when the rotation gear 47 rotates even further clockwise, the movable member 61 rotates clockwise, linked to the rotation gear 47, due to the operating portion 53 pressing against the receiving portion 64. Then, as shown in FIG. 13C, the other end 62b of the magnet 62 disposed on the movable member 61 passes beyond the first magnetic sensor 68A, and, at approximately the same time, the one end 62a of the magnet 62 passes beyond the third magnetic sensor 68C. In this manner, the first magnetic sensor 68A becomes OFF state, and the third magnetic sensor 68C becomes an ON state. The second magnetic sensor 68B maintains the OFF state.

Next, as shown in FIG. 13D, the second magnetic sensor 68B becomes an ON state when the one end 62a of the magnet 62 passes, linked to the movable member 61, beyond the second magnetic sensor 68B. The first magnetic sensor 68A maintains the OFF state and the third magnetic sensor 68C maintains the ON state.

Then, as shown in FIG. 13E, linked to the movable member 61, the one end 62a of the magnet 62 passes beyond the first magnetic sensor 68A and the first magnetic sensor 68A once more becomes an ON state. The second and third magnetic sensors 68B and 68C maintain the ON state.

Next, the microcomputer 69 detects the state in FIG. 13E via the magnetic sensors 68A to 68C and thus determines that the cam follower 54 has reached the lock region, and that the lock bolt 32, via the rotation gear 47 and the cam member 37, has reached a lock state, and then the microcomputer 69 stops the electric motor 45. The rotation gear 47 and the movable member 61 rotate to the state shown in FIG. 13F due to inertia. In this state, the first to third magnetic sensors 68A to 68C maintain the ON state.

Incidentally, if, with the exception of the first magnetic sensor 68A, one of the magnetic sensors 68B or 68C fails, safety can be sufficiently maintained by continuing control on the basis of the detection of the first magnetic sensor 68A. On the other hand, if the first magnetic sensor 68A fails, determination can be made with the third magnetic sensor 68C as to whether the lock bolt 32 has retracted to the unlock region, and determination can be made with the second magnetic sensor 68B as to whether the engaging convex portion 33 of the lock bolt 32 has advanced into the engaging concave portion 2 of the steering shaft 1.

In the power steering lock unit of the present invention, the movable member 61, to which the magnet 62 is fastened, is movably held by the holder 70 at a prescribed spacing to the base plate 65 on which the magnetic sensors 68A to 68C are disposed, thus the lock bolt 32 and the transmission mechanism are not influenced by rattling movements, and the magnetic sensors 68A to 68C and the magnet 62 can be maintained at a prescribed spacing from each other. As a result, the accuracy of detecting the position of the lock bolt 32, via the movable member 61, the rotation gear 47, and the cam member 37, improves. Moreover, the movable portion 61 is structured with a ring shape and structured to rotate, thus the movement space of the movable member 61 is made smaller. As a result, the actual power steering lock unit is made smaller.

Moreover, the second unlock detection position, which detects the unlock state, is positioned on the lock side of the first unlock detection position, thus the detection region, when the movement is from the unlock position to the lock position, is wide. As a result, even if vibrations due to the running of the automobile cause the rotation gear 47 or the movable member 61 to move slightly, the position detection means will not mistakenly determine that there has been a suspension of the unlock state. As a result, the operation of failure determination or alarm functions due to errors in operation is prevented with certainty.

Furthermore, in the present embodiment, the protrusion portion 43 is provided, between the first and second unlock detection positions, as movement prevention means, thus the rotation gear 47 is held in the unlock position even if there are vibrations during the running of the automobile. Hence, once the first magnetic sensor 68A switches to the unlock state by passing by the first unlock detection position, the first magnetic sensor 68A will not switch back from the unlock region when the rotation gear 47 is in the unlock region. Thus the reliability of the sensor output is improved.

Note that the power steering lock unit of the present invention is not limited to the structure of the previously described embodiment described above, but that various types of modifications are possible.

For example, in the previously described embodiment sensors for detecting the movement position of the movable member detected the magnetism of the magnet 62; however, a structure may also be employed in which detection is made of a physical structure such as a micro switch. Of course, the sensor are not limited to three, but the number of sensors can be selected as appropriate according to need, and the control performed on the basis of the detection of the sensors may be set as desired.

Moreover, the cam grooves 42 have been provided on the cylindrical cam member 37, and the cam follower 54 has been disposed on the vertical grooves 51 of the rotation gear 47, however, the cam grooves may be provided on the rotation gear 47, and the cam follower 54 may be disposed on the cylindrical portion of the lock bolt 32 corresponding to the cam member 37.

Furthermore, in the present embodiment, the operating portion 53, which moves linked to the movable member 61, is provided on the rotation gear 47; however, the present invention is not limited to this structure. For example, the operating portion 53 may be provided on the lock bolt 32 which moves linearly. In this case, the movable member 61 is disposed on the base plate 65 or the like, opposite the lock bolt 32, in a linearly movable manner. Two receiving portions 64 and 64 are provided, separated at a prescribed spacing which includes the spacing of the play P, on the movable member 61, and the operating portion 53 of the lock bolt 32 is interposed between the pair of receiving portions 64 and 64. Thus, in the same manner as in the previously described embodiment, the movable member 61 moves linked to the movement of the lock bolt 32 after a prescribed delay time.

What is claimed is:

1. A power steering lock unit comprising:
    a lock bolt which is movable between a lock position, at which the lock bolt engages a steering shaft, and an unlock position, at which the engagement is released;
    an actuator for moving the lock bolt;
    a transmission mechanism for transmitting a drive force of the actuator to the lock bolt and thus moving the lock bolt between the lock position and the unlock position; and
    a position detection mechanism for detecting a movement position of the lock bolt,
    wherein the transmission mechanism includes
       a rotation gear arranged to move the lock bolt between the unlock position and the lock position,
       a cam member linked to the lock bolt,
       a cam groove provided on one of the rotation gear and the cam member, the cam groove forming a substantially spiral path so as to convert a rotational movement of the rotation gear to a linear movement of the lock bolt via the cam member, the cam groove being centered around a center of rotation of the rotation gear, and
       a cam follower provided on the other of the rotation gear and the cam member, the cam follower being arranged to slidably move in the cam groove,
    wherein the position detection mechanism includes
       a movable member to which a magnet is fixed,
       a base plate on which a magnetic detection means for detecting a magnetic force of the magnet is disposed, and
       a holder for holding, in an operable manner, the movable member at a prescribed spacing from the base plate,
    wherein the rotation gear includes an operating portion and the movable member includes a receiving portion, and a linking mechanism is provided for by abutting the operating portion on the receiving portion so as to operate the movable member in an interlocked manner with operation of the rotation gear,
    wherein a play is provided between the operating portion and the receiving portion such that the movable member is arranged to move, after a prescribed time delay, in response to the movement of the rotation gear, and
    wherein the magnetic detection means is arranged to detect the force of the magnet of the movable member so as to determine the movement position of the lock bolt via the movable member and the transmission mechanism.

2. The power steering lock unit according to claim 1, wherein
    the movable member is ring-shaped, and wherein a center of rotation thereof is perpendicular to the base plate.

3. The power steering lock unit according to claim 1, wherein the magnetic detection means comprises a sensor for detecting a first detection position of the rotation gear in which the rotation gear is in an unlock position, and a second detection position of the rotation gear in which the rotation gear is retracted from the unlock position, wherein the second detection position is closer to a lock position along a rotational path of the rotation gear than is the first detection position.

4. The power steering lock unit according to claim 3, further comprising movement prevention means for preventing the rotation gear from moving from the unlock position to the lock position, the movement prevention means being positioned between the first and second detection positions, wherein the drive force of the actuator is sufficient to move the rotation gear past the movement prevention means to the lock position.

5. The power steering lock unit according to claim 4, wherein
    the movement prevention means comprises a protrusion portion which protrudes into the cam groove, so that a sliding movement of the cam follower is prevented.

6. The power steering lock unit according to claim 1, wherein the magnetic detection means comprises a first sensor for detecting a first detection position of the rotation gear in which the rotation gear is in a lock position, and a second detection position of the rotation gear in which the rotation gear is retracted from the lock position.

7. The power steering lock unit according to claim 6, wherein the magnetic detection means comprises a second sensor for detecting a third detection position of the rotation gear so as to determine whether a tip end of the lock bolt retracts, via the rotation gear, from an opening end of an engaging concave portion of the steering shaft as the lock bolt is moved from the lock position to the unlock position.

8. The power steering lock unit according to claim 7, wherein the magnetic detection means comprises a third sensor for detecting whether the lock bolt is in the unlock position.

* * * * *